United States Patent [19]
Bauer et al.

[11] Patent Number: 6,061,436
[45] Date of Patent: May 9, 2000

[54] TELEPHONE BILLING SYSTEM

[75] Inventors: Thomas Michael Bauer, Belle Mead; Christopher P. Gilboy, Freehold, both of N.J.

[73] Assignee: AT&T Corp, New York, N.Y.

[21] Appl. No.: 08/857,663

[22] Filed: May 16, 1997

[51] Int. Cl.[7] .................................................. H04M 15/00
[52] U.S. Cl. .......................... 379/114; 379/115; 379/127; 379/121
[58] Field of Search .................................... 379/114, 112, 379/115, 120, 100.01, 100.11, 100.03, 100.04, 100.05, 144; 358/400, 401, 434

[56] References Cited

U.S. PATENT DOCUMENTS

| | | | |
|---|---|---|---|
| 4,757,267 | 7/1988 | Riskin | 379/113 |
| 4,879,742 | 11/1989 | Taniguchi et al. | 379/111 |
| 5,003,584 | 3/1991 | Benyacar et al. | 379/119 |
| 5,068,888 | 11/1991 | Scherk et al. | 379/100.01 |
| 5,146,491 | 9/1992 | Silver et al. | 379/114 |
| 5,148,474 | 9/1992 | Haralambopoulos et al. | 379/111 |
| 5,179,584 | 1/1993 | Tsumura | 379/114 |
| 5,187,710 | 2/1993 | Cvhau et al. | 379/114 |
| 5,196,943 | 3/1993 | Hersee et al. | 358/407 |
| 5,260,986 | 11/1993 | Pershan | 379/88 |
| 5,381,467 | 1/1995 | Rosinski et al. | 379/121 |
| 5,524,142 | 6/1996 | Lewis et al. | 379/114 |
| 5,537,464 | 7/1996 | Lewis et al. | 379/114 |
| 5,568,541 | 10/1996 | Greene | 379/114 |
| 5,602,907 | 2/1997 | Hata et al. | 379/114 |
| 5,646,984 | 7/1997 | Oda | 379/114 |
| 5,710,807 | 1/1998 | Smith | 379/114 |
| 5,742,667 | 4/1998 | Smith | 379/114 |
| 5,745,556 | 4/1998 | Ronen | 379/112 |

*Primary Examiner*—Curtis A. Kuntz
*Assistant Examiner*—Rexford N Barnie

[57] ABSTRACT

A method and apparatus for billing a customer for a service that is assessed independent of the calling duration or the per call cost. A service is billed and delivered during a call without the called party being present to receive the call and without operator-assisted verification. A calling party can order a service that is not delivered through the call itself.

18 Claims, 4 Drawing Sheets

| ORIGINATING NUMBER | TERMINATING NUMBER | CONFIRMATION REQUIRED FLAG | REVERSE CHARGES FLAG | ADDITIONAL BILLING TYPE | ADDITIONAL BILLING AMOUNT |
|---|---|---|---|---|---|
| 908 123-4567 | 908 123-1111 | Y | Y | "PER MIN" | 10.00 |
| 908 123-4567 | 201 644-8283 | Y | N | "PER CALL" | 0.00 |
| 708 747-8123 | 908 123-1111 | N | Y | "PER MIN" | 19.95 |
| 412 758-0000 | 303 975-9999 | N | N | "PER CALL" | 9.95 |
| 303 975-9999 | 201 823-1234 | Y | N | "PER CALL" | 1.00 |
| 215 888-8765 | 630 393-1234 | Y | Y | "PER MIN" | 0.50 |
| * | 932 949-7700 | N | Y | "VARIABLE" | TBD |
| * | 303 747-5432 | N | N | "VARIABLE" | TBD |
| * | 800 888-0000 | N | N | "VARIABLE" | TBD |

FIG. 4

| MATCH FLAG | CONFIRMATION REQUIRED FLAG | REVERSE CHARGES FLAG | ADDITIONAL BILLING TYPE | ADDITIONAL BILLING AMOUNT |
|---|---|---|---|---|

FIG. 5

- ORIGINATING NUMBER — 100
- TERMINATING NUMBER — 101
- BILLED NUMBER — 102
- START TIME — 103
- ELAPSED TIME — 104
- REVERSED CHARGE'S FLAG — 105
- ADDITIONAL BILLING TYPE — 106
- ADDITIONAL BILLING AMOUNT — 107

TELEPHONE BILLING SYSTEM

FIELD OF THE INVENTION

The present invention relates to the field of telecommunications. Specifically, the present invention relates to a method and apparatus for billing a customer for services that are assessed independent of the calling time or the per call bill rate.

BACKGROUND

Several known prior art systems allow a provider of a service that is delivered through a phone call to charge a customer for the cost of the service as well as the cost of the call. These value-added services, e.g., 900 number services, are designed for mass calling of a service provider's number where each calling party is billed for the cost of the call and the cost of the service. Because the customer initiates the call, the customer provides authorization for the cost of the call and cost of the service at the beginning of the call. For such a service, the telephone company directly bills the customer for the cost of the call and the cost of the service. The telephone company then reimburses the service provider for the value of the service provided to the customer.

U.S. Pat. No. 5,003,584, issued in the name of Banyacar and assigned to AT&T on Mar. 26, 1991, is an example of an enhanced value-added 900 number service. This system bills a calling party for the cost of a call and the cost of the service through either the automatic number identification (ANI) indicating the call originating number or a credit card number provided by the calling party. The service provider can define and modify the rate of or the total cost of the call while the call is in progress. The cost of the call and the cost of the service provided are then billed to the calling party. The assessed service costs are based on the time and the billing rate of the call or based on a flat per call charge.

These types of prior art systems suffer from several shortcomings. First, these systems cannot bill a customer for the cost of the service alone. These systems all assume that the service is delivered by a call for which charges must be assessed. Second, the cost of the service provided is assessed as a function of the call duration or the per call cost. These systems cannot bill for services that are provided independently from the call itself. Finally, these systems assume the customer initiates the call to the service provider; these systems cannot allow the service provider to call their customers and charge the cost of the service and/or the cost of the call.

Another class of known prior art systems attempt to include the cost of a service in the telephone bill independently from the call duration or the per call cost. Specifically, U.S. Pat. No. 5,148,474, issued to Haralambopouos et al. on Sep. 15, 1992, is an example of one such system. In this system, a customer can call a retailer and order goods and/or services from the retailer. The retailer can then establish a second connection to a network wherein this second connection is billed at a predetermined rate. This system requires the service provider to have access to several value-added numbers to account for the different possible costs of the service provider's goods and/or services. In other words, the service provider will dial one or more unique value-added numbers for each unique price of the goods and/or services so that the total charges for the value-added numbers equal the cost of the goods and/or services.

U.S. Pat. No. 5,179,548, issued to Tsumura on Jan. 12, 1993, is an example of a similar prior art system. In this system, the service is provided only at the user's physical location where special dedicated telephone line is connected to the service provider's equipment. When a customer accesses the service provider's equipment, the telephone company is called over the dedicated telephone line connected to the service provider's equipment; the user is billed through the telephone company for the cost of the service in an amount equal to the charges assessed for the dedicated line. A digital karaoke machine installed on a user's premises is a typical embodiment of the Tsumura system. Every time the karaoke machine is used, a connection is established through the dedicated line and the user is billed by the telephone company for the phone call. The karaoke service provider is then reimbursed by the telephone company. Multiple dedicated lines having varying billing rates may be necessary to handle different billing amounts to generate the desired composite bill for the use of the karaoke system.

These known service billing systems which do not bill as a function of the call suffer from several shortcomings. In these systems, the service provider's equipment must be located on the user's premises or the service provider must establish a second connection. In either case, the billing of the service is based upon the billing rate associated with an unnecessary telephone connection where the assessed charges are calculated as a function of that unnecessary call duration or per call fee.

U.S. Pat. No. 5,381,467 issued in the name of Rosinski et al. and issued on its face to AT&T Corp., is another type of prior art system which allows the cost of the call to be split between the calling party and the called party according to a preauthorized arrangement. This system, however, cannot bill a customer for the cost a value-added service delivered through or ordered during the call. Furthermore, the billing of the call is based on divisible time periods of the call during. This system cannot bill for services that are provided independently from the call itself.

SUMMARY OF THE INVENTION

The present invention bills for a service delivered during a call without the called party being present to receive the call and without operator-assisted verification.

The present invention bills a delivered service independent from the call duration or the per call cost.

The present invention allows a calling party to order a service that is not delivered through the call itself.

The service provider can be the calling party or the called party; correspondingly, the customer ordering or receiving the service can be the called party or the calling party. The service provided can be one or more services and/or one or more goods. For example, the service can be a weekly newsletter provided by a calling party service provider. Alternatively, the service, for example, can be merchandise ordered by a called party customer from a called party catalog order retailer.

In one embodiment of the present invention, a calling party is billed for a service delivered during a call between the calling party and a called party, within a communications network. The service is delivered during the call and is unrelated to the establishment of the call. A preauthorized confirmation signal is detected thereby indicating that the called party is to be billed for the cost of the service. A billing record associated with the call is marked based on the detected confirmation signal.

The service can be delivered to the called party without confirmation during the call. Alternatively, the service can be delivered to the called party when the call is established without the called party's presence. Similarly, the service can be delivered to the called party when the call is established without directory assistance.

The called party can be billed for the service based on the marked billing record. Alternatively, the called party can be billed for the service based on the marked billing record and for the cost of the call. The service delivered to the called party can be a newsletter.

In another embodiment of the present invention, a billing record can be received from the called party based on a cost of the service ordered. A rating record of charges of the calling party can be updated based on the billing record. The calling party can be billed for the service based on the rating record. Alternatively, the calling party can be billed for the service based on the rating record and for the cost of the call. The called party can be a service provider; the calling party can be a customer of the service provider.

In another embodiment of the present invention, a calling party can be billed for a service ordered during the call between a calling party and a called party, within a communications network. A billing record can be billed based on a cost of the service ordered. The updated billing record can be forwarded to a billing processor.

In an embodiment of the present invention, a switching system, connected to the communications network, receives, from the called party, a billing record based on a cost of the service ordered. The switching system updates a rating record of charges of the calling party based on the billing record.

DETAILED DESCRIPTION

Throughout the course of the discussion of the present invention, it is important to note that a service provider can be either the calling party or the called party. For example, where the service provider is calling party and the customer is the called party, the present invention can bill for a service delivered during a call without the called party customer being present to receive the call. The service can be, for example, a weekly newsletter. The corresponding service provider could provide the weekly newsletter to a set of preauthorized or presubscribed customers via their facsimile machines. The subscribing customer would receive the weekly newsletter facsimile without accepting the charges for each delivery. The subscribing customer would then be automatically billed for the delivered newsletter.

Where the service provider is called party and the customer is the calling party, the present invention can allow the calling party customer to order a service that is not delivered through the call itself and delivered service can be billed independent from the call duration or the per call cost. For example, the service provider can be a catalog order retailer and the service can be a product, such as a flannel shirt. The calling party customer can initiated a call to the called party retailer and order the merchandise. The calling party customer would then be billed for the delivered merchandise through the phone bill.

Figure 1:
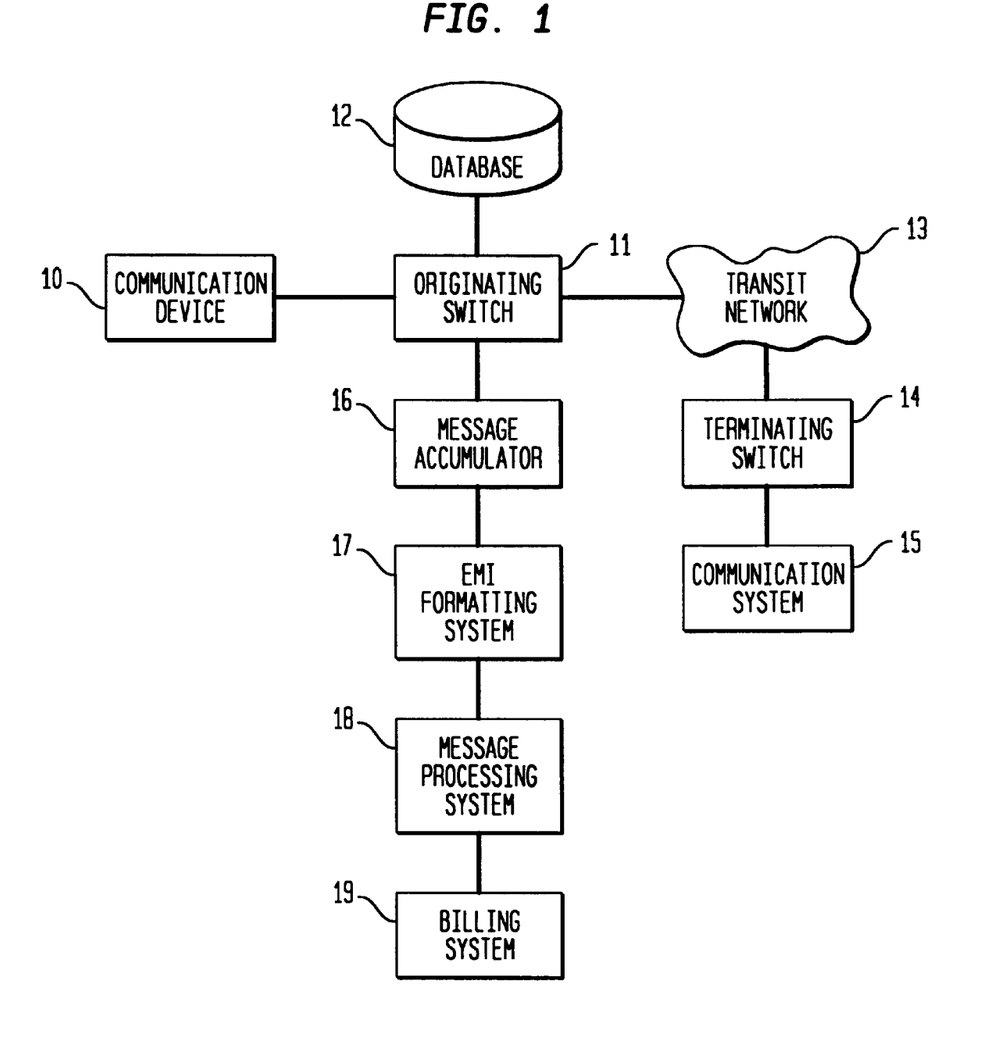
FIG. 1 illustrates a communications network according to an embodiment of the present invention.

FIG. 1 illustrates a communications network according to an embodiment of the present invention. Communication device 10 is connection to originating switch 11 which is in turn connected to transit network 13. Communication device 15 is connected to terminating switch 14 which is in turn connected to transit network 13. Database 12 is connected to originating switch 11. Originating switch 11 is connected to message accumulator 16 which is in turn connected to exchange message interface (EMI) formatting system 17. EMI formatting system 17 is connected to message processing system 18 which is in turn connected to billing system 19.

Communication devices 10 and 15 can be any of a variety of types such as a telephone, facsimile machine or a personal computer. Communication devices 10 and 15 transmit and receive information through originating switch 11, transit network 13, and terminating switch 14. The term "information" as used herein is intended to include data, text, voice, audio, video and/or multimedia.

Originating switch 11 and terminating switch 14 are switching centers that receive and deliver calls. In the example illustrated in FIG. 1, originating switch 11 receives calls from communication device 10; terminating switch 14 delivers that call to communication device 15. Originating switch 11 and terminating switch 14 each has a processor, computer readable memory, a data port, a network port and a data bus. The data port can be connected to a communication device. The network port can be connected to transit network 13. The data bus connects the processor, the computer readable memory, the data port and the network port.

Originating switch 11 and terminating switch 14 operate special software to perform functions associated with toll calls and/or local calls. Originating switch 11 and/or terminating switch 14 can contain a dual tone modulated frequency (DTMF) detection unit to receive the DTMF signals. Alternatively, originating switch 11 and/or terminating switch 14 can contain a voice recognition unit to recognize voice responses. The AT&T 4ESS® switch and the Lucent Technologies 5ESS® switch are examples of the hardware that can perform the functions of originating switch 11 and terminating switch 14.

Note that while FIG. 1 merely shows one switch between a communication device and transit network 13, additional switches can be present as well. In other words, although transit network 13 only shows originating switching 11 and terminating switch 14 connected, any number of additional switches in fact may be connected to transit network 13. Transit network 13 can be of any type including, for example, the public switching telephone network (PSTN) international networks, the Internet or any combination of networks. For example, in the case where originating switch 11 and terminating switch 14 are central offices of local exchange carriers (LECs), transit network 13 can be the AT&T interexchange carrier (IXC) network. Alternatively, in the case where originating switch 11 and terminating switch 14 are IXC switches, switches 11 and 14 in addition to transit network 13 can comprise the AT&T IXC network; although not shown, central office switches can connect switches 11 and 14 to communication devices 10 and 15, respectively.

Although FIG. 1 only shows communication device 10 connected to originating switch 11 and communication device 15 connected to terminating switch 14, any number of additional communication devices may be connected to originating switch 11 or terminating switch 14.

Database 12 contains customer records and can be embodied by a database server that receives database queries from originating switch 11. Database 12 can communicate with originating switch 11 by any of a number of protocols including the SS7 (Signaling System 7) protocol.

Message accumulator 16 is a billing data collection and processing system. For example, message accumulator 16 can be embodied by special software operating on a computer, such as the Lucent Technologies BILLDATS® system. EMI formatting system 17, message processing system 18 and billing system 19 are processing systems that can be embodied by special software operating on a mainframe computer.

Figure 2A:
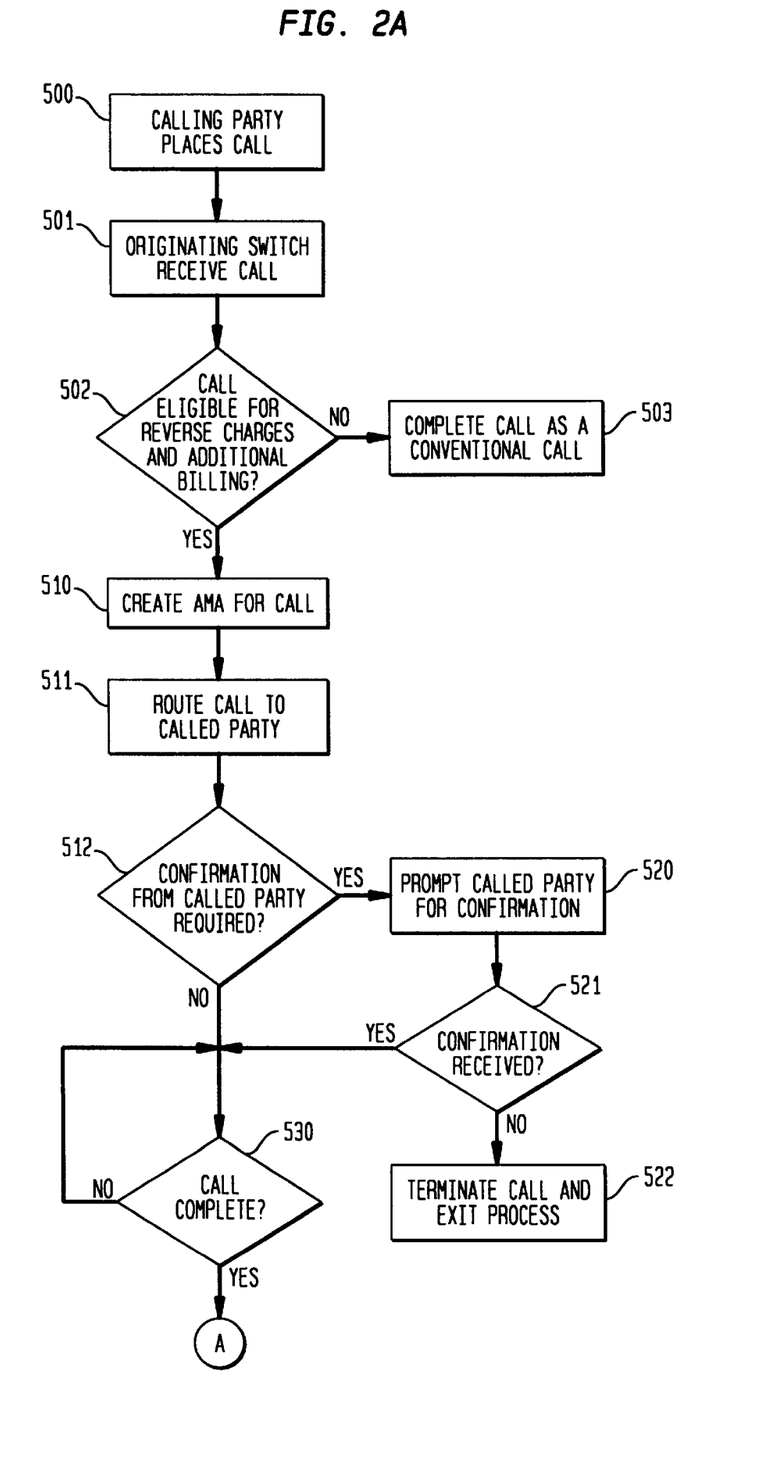
FIGS. 2A and 2B provide a flow chart illustrating the manner in which calls are processed according to an embodiment of the present invention.
Figure 2B:
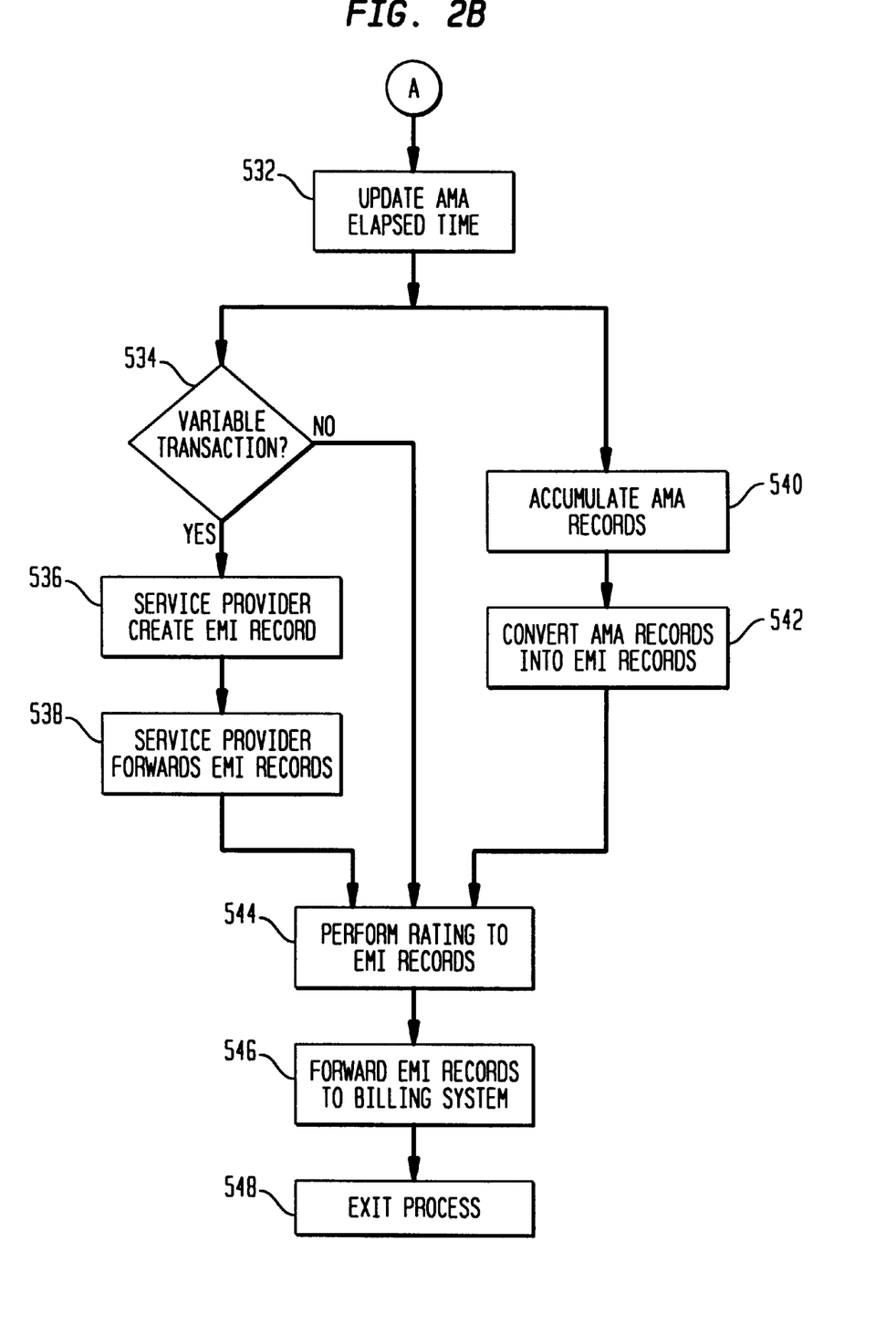

FIGS. 2A and 2B provide a flow chart illustrating the manner in which calls are processed according to an embodiment of the present invention. The process begins at step 500 where the calling party places a call. At step 501 the call is received at originating switch 11. Originating switch 11 receives call originating number 200 and call terminating number 201 from communication device 10. Call originating number 200 can be determined by automatic number identification (ANI); call terminating number 201 can be the number dialed by the calling party.

At conditional step 502, originating switch 11 queries database 12 to determine whether this particular call is eligible for automatic reverse charges and additional billing. The query received by database 12 includes call originating number 200 and call terminating number 201. Originating switch 11 communicates with database 12 by any of a number of protocols including the SS7 protocol.

Figure 3:
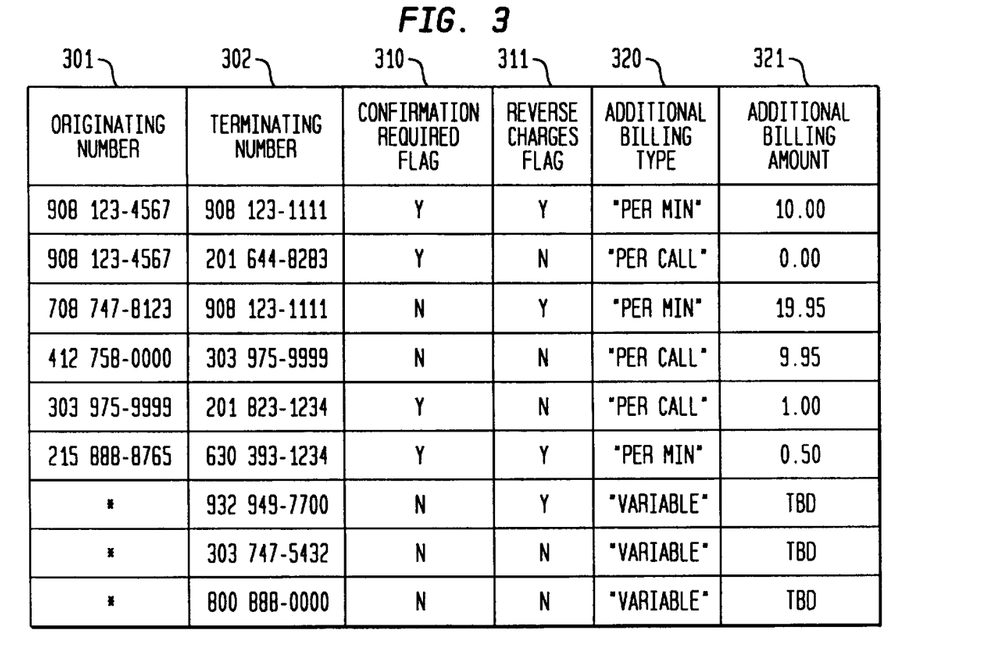
FIG. 3 illustrates a subscription record layout for database records according to an embodiment of the present invention.

FIG. 3 illustrates the subscription record layout for records in database 11 according to an embodiment of the present invention. The subscription record layout contains the following components: originating number 301, terminating number 302, confirmation required flag 310, reverse charges flag 311, additional billing type 320, and additional billing amount 321.

Originating number 301 is the layout record field that can contain the number of a calling party who has subscribed to a service provided by the service provider; for example, originating number 301 can be the ten-digit phone of the calling party located at communication device 10 and can be determined by the ANI. Note that originating number 301 can contain a wildcard value; for example, the wildcard value can be embodied by an asterisk, "*". A match will be found for any value of call originating number 200 where originating number 301 in the subscription record layout has a wildcard value.

Terminating number 302 is the layout record field that can contain the number of the called party who is a service provider; for example, terminating number 302 can be the ten-digit number dialed by the calling party and corresponding to the location of communication device 15.

Confirmation required flag 310 indicates whether confirmation is required before reverse call charges and/or automatic billing can be assessed with the call. Specifically, if the flag is set to "Y", then the called party has indicated that confirmation is required. If confirmation required flag 310 is set to "N" then the called party has indicated that confirmation is not required before reverse call charges and/or automatic billing can be assessed with the call.

Reverse charges flag 311 indicates whether the charges of the call should be reversed to the called party. If the flag is set to "Y" the call charges will be reversed to the called party; otherwise, the call charges will be assessed to the calling party.

Additional billing type 320 indicates the method by which the provided service should be charged. Additional billing type 320 can have the following values: "per minute" indicating that the service should be charged on a predefined per minute rate, "per call" indicating that the service should be charged as a single predefined charge, and "variable" indicating that the charge for the service can vary with each call. When additional billing type 320 has the value of "variable," the charge for the service can be determined during the call or after the call is completed. In another embodiment of the present invention, additional billing type 320 can have the following values: "0" indicating the call should be charged on a predefined per minute rate, "1" indicating that the service should be charged as a single predefined charge, and "2" indicating that the charge for the service can vary with each call.

Additional billing amount 321 indicates the additional cost of the service. This additional cost can be predefined, set during the transaction or set after the transaction. For example, when additional billing type 320 is "per call," additional billing amount 321 can be predefined.

Returning to step 502 in FIGS. 2A and 2B, database 12 checks its subscription data records to evaluate the call. The call will be eligible for reverse charges and/or additional billing if the call originating number matches a database entry for originating number 301 and the call terminating number matches the corresponding database entry for terminating number 302.

Figure 4:
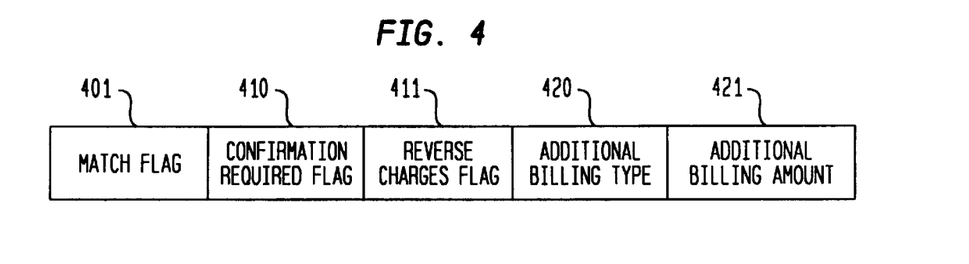
FIG. 4 illustrates the information that is passed from a database to an originating switch according to an embodiment of the present invention.

Once the query of database 12 is complete, database 12 forwards the query results to originating switch 11. FIG. 4 illustrates the query results that are passed from database 12 to originating switch 11 according to an embodiment of the present invention. Match flag 401 is a flag indicating whether any record within database 11 corresponded to both the call originating number and the call terminating number.

When a matched record is found within database 12, the query results include the following: confirmation required flag 410, reverse charges flag 411, additional billing type 420 and additional billing amount 421. Confirmation required flag 410 is the value of the confirmation required flag 310 for the matched record. Reverse charges flag 411 is the value of the reversed charges flag 311 for the matched record. Additional billing type 420 is a value of the additional billing type 320 of the matched record. Additional billing amount 421 is the value of additional billing amount 321 for the matched record.

Based on the value of match flag 401, originating switch 11 determines whether the call is eligible for reverse charges and additional billing. If the call is not eligible for reverse charges and/or additional billing, then the process proceeds to step 503 where the call is completed as a conventional call. If the call is eligible for reversed charges and additional billing based on match flag 401, then the process proceeds to step 510.

Figure 5:
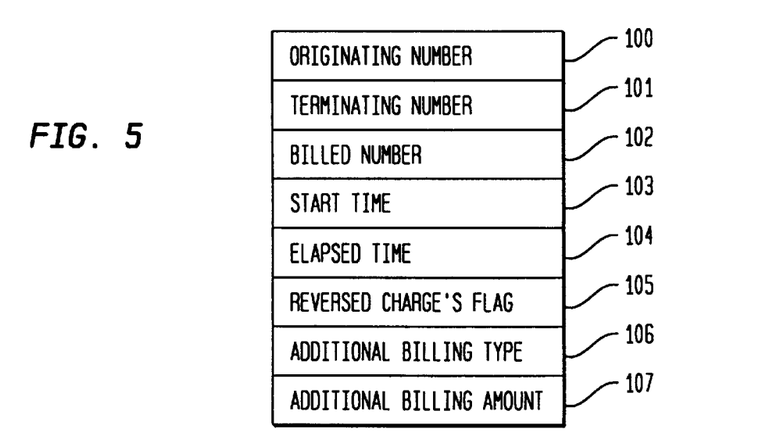
FIG. 5 illustrates an automatic message accounting billing record layout according to an embodiment of the present invention.

At step 510, originating switch 11 creates an AMA record. FIG. 5 illustrates the automatic message accounting (AMA) billing record layout according to an embodiment of the present invention. An AMA record is generated for each call initiated by the calling party so that the call can be properly billed. The AMA record is populated with the information necessary to properly bill the appropriate party, such as the calling party or the called party. As FIG. 5 illustrates, the AMA billing record can include the following elements: originating number 100, terminating number 101, bill number 102, start time 103, elapse time 104, reverse charges flag 105, additional billing of type 106 and additional billing amount 107.

Originating number 100 indicates the calling party's location at communication device 10; for example, originating number 100 can be the ten-digit phone number of the calling party. Terminating number 101 indicates the called party's location at communication device 15; for example, terminating number 101 can be the ten-digit dialed phone number.

Billed number 102 typically has a default value of an empty value indicating that the call should be billed to originating number 100. Bill number 102, however, can have a number different than the originating number 100. For example, when the call is billed to a calling card number, billed number 102 can be different than the originating number.

Start time 103 indicates the time that the call was initiated. Elapse time 104 indicates the duration of the call. Reverse charges flag 105 is a flag indicating whether or not the call charges should be automatically reversed. Reverse charges flag 105, for example, can have a value of "Y" for automatic reversed charges or a value of "N" for no reversed charges. Note that although reverse charges flag 105 discussed herein and other flags discussed below are described with respect to a "Y" or "N" value, any distinguishing value can be effective; for example, the flags can have a value of "1" or "0".

Additional billing type 106 indicates how the additionally provided service should be billed. Note that term "service" is used herein to include one or more services and/or one or more goods. Additional billing type 106 can be determined while the call is in progress or after the call is completed. For example, additional billing type 106 can indicate whether the service will be billed on predefined "per minute" cost, a predefined "per call" cost or a "variable" cost that is determined during the call. The "variable" cost can be applicable for a call where the called party is a retailer. In such a case, the billed amount assessed for the service provided by the retailer will be determined during the course of the call and will not necessarily be known before the call is initiated.

Additional billing amount 107 is the amount of billing in addition to the cost of the call that must be billed for the provided service. Additional billing amount 107 can be based upon the additional billing type 106, elapsed time 104 and reverse charges flag 105.

Returning to step 510 in FIGS. 2A and 2B, originating number 100 of the AMA record is populated with call originating number 200. Terminating number 101 of the AMA record is populated with call terminating number 201. Billed number 102 of the AMA record is left blank or is populated as understood in the prior art. Reverse charges flag 105 of the AMA record is populated with reverse charges flag 411. Additional billing type 106 of the AMA record is populated with additional billing type 420. Additional billing amount 107 of the AMA record is populated with additional billing amount 421.

At step 511, originating switch 11 routes the call through transit network 13 and terminating switch 14 to communication device 15. When the call is connected, originating switch 11 records the time in start time 103 of the AMA record.

At conditional step 512, confirmation required flag 401 is checked to determine whether the called party at communication device 15 has preauthorized the use of the reverse collect call and the additional billing amount. If confirmation required flag 401 is set to "N", then the called party has preauthorized reversing the charges for the call and preauthorized additional billing for a service; the process proceeds to step 530.

Note that the service provider can be the calling party such as the first example discussed above regarding a calling party service provider automatically sending a weekly newsletter to preauthorizing called party customers, even when the customers are not present during the call. As a further example, a text, multimedia, or audio newsletter can be automatically delivered, respectively, to a facsimile machine, computer or answering machine.

Because a called party can preauthorize reversed call charges and additional billing, a service provider can call multiple predefined customers and automatically charge the cost of the service and/or the cost of the call to the customers' phone bills. Consequently, operator-assisted verification for every call to every called party is not required. Furthermore, services that are delivered by the call can be delivered without the called party being present to receive the call.

Returning to conditional step 512 in FIGS. 2A and 2B, if confirmation required flag 401 is set to "Y", then the process proceeds to step 520. At step 520, the called party at communication device 15 is prompted for a confirmation. For example, the recorded message can be used, such as: "You are receiving a call with the charges reversed and an additional amount of $9.95 for the call. If you accept this, please press 1 on your touch tone phone; otherwise, please hang up." In an alternative embodiment, the called party is required to respond with their voice indicating a "yes" or a "no."

At step 521, originating switch 11 receives the confirmation from the called party. Originating switch 11 can contain a dual tone modulated frequency (DTMF) detection unit to receive the confirmation. Alternatively, originating switch 11 can contain a voice recognition unit to recognize the called party's voice response. If the called party indicates the confirmation is not given or provides an invalid response, then the process proceeds to step 522 where the call is terminated and the process ends. If the confirmation is properly received, then the process proceeds to conditional step 530.

At conditional step 530, the call is monitored until the call is completed. When the call is completed, the process proceeds to step 532.

At step 532, AMA elapsed time 104 of the AMA record created in step 510 is updated with the termination time of the phone call. The process then proceeds to conditional step 534 and step 540.

At conditional step 534, additional billing type 106 is checked to determine whether the call is a variable transaction call. If additional billing type 106 does not have a value of "variable," then the process proceeds to step 544. If additional billing type 106 does have the value of "variable," then the process proceeds to step 536.

At step 536, the service provider creates an EMI record having an industry-standard format. Note that the service provider can be the called party such as the second example discussed above regarding a calling party customer ordering merchandise from a called party catalog order retailer.

The EMI record can be directly created by the service provider manually or automatically, such as through a computer system. The EMI record must include originating number 100 which was passed by the network to the service provider during the call set up, start time 103 which was populated with the time of the transaction, additional billing type 106 which should be set to "variable," and additional billing amount 107 which should be populated with the correct amount of the charge for the service. The value for additional billing amount 107 can be set by the service provider individually for each call received by that service provider. In other words, the service provider customizes the correct amount of the charge for the product or services associated with the calling party.

At step 538, the service provider forwards the EMI record to message processing system 18. In one embodiment of the present invention, the service provider accumulates the EMI records from several calls and periodically forwards these EMI records to message processing system 18. For example, the service provider can forward all of the EMI records accumulated within a week. In another embodiment of the present invention, the service provider immediately forwards the EMI record soon after it is created in step 536.

At step 540, the AMA record associated with the call and updated in step 532 is forwarded from originating switch 11 to message accumulator 16 and accumulated with other AMA records. On a periodic basis, for example once a day, these AMA records are forwarded to the EMI formatting system 17.

In step 542, EMI formatting 17 accepts the call-related AMA records and converts them into EMI records. Note that two separate EMI records can be created for each call: one EMI record associated with the charge for the service provided by the service provider, a second call-related EMI record.

In step 544, message processing system 18 receives any call-related EMI records created in step 542 and any EMI records created by the service provider in step 536. Message processing system 18 uses these EMI records to compute the charges associated with each call and any service provided. These charges are then combined into an EMI record for each call. This process is commonly referred to as "rating the telephone calls."

In step 546, the resulting EMI records are forwarded to billing system 19 where they reside until processed to generate a "hard copy" of an aggregate bill that is mailed to each individual customer. In step 584, the process ends.

Note that the present invention works equally well with dialed numbers that are 800 numbers, toll numbers, local numbers as well as 900 numbers. In the case of a dialed number that is an 800 number, such as a customer calling a mail-order catalog retailer, an EMI record can be created for any purchased service and an AMA can be created for the 800 number which is billed to the retailer. In the case where a service is provided through a number for which the calling party does not pay any additional charges, it is possible that an EMI record is created for the service, but an AMA record is not created for the charges associated with the call. For example, where a service is provided through a local number for a calling party that pays a flat fee for unlimited local calling, an EMI record can be created for any provided service, but an AMA record would not be created for the charges associated with the local call. Conversely, where the calling party has a limited local calling plan and pays for local calls over a predetermined maximum, an AMA record can be created for any provided service, and an EMI record would be created for the charges associated with the local call. The resulting AMA and/or EMI records would be similar for a calling party obtaining a service through a toll call.

It should of course be understood that while the present invention has been described in reference to a particular system configuration and process, other system configurations and processes should be apparent to those of ordinary skill in the art. For example, the present invention can include any number of communication devices, originating switches, terminating switches, and be connected to a communication network or combination of communication networks.

What is claimed is:

1. A method for billing a called party for a service delivered during a call between the calling party and a called party, within a communications network, comprising:
    (a) detecting a preauthorized confirmation signal indicating that the called party is to be billed for the cost of the service; and
    (b) marking a telephone billing record associated with the call based on the detected confirmation signal, the telephone billing record being a basis of a phone bill and having a billing amount associated with the cost of the delivered service, at least a portion of the billing amount associated with the delivered service being unrelated to a duration of the call.

2. The method of claim 1, further comprising:
    (c) delivering the service to the called party without confirmation during the call.

3. The method of claim 1, further comprising:
    (c) delivering the service to the called party when the call is established without the called party's presence.

4. The method of claim 1, further comprising:
    (c) delivering the service to the called party when the call is established without directory assistance.

5. The method of claim 1, further comprising:
    (c) billing the called party for the service based on the marked billing record of step (b).

6. The method of claim 1, further comprising:
    (c) billing the called party for the service based on the marked billing record of step (b) and for the cost of the call.

7. The method of claim 3, wherein the service delivered to the called party in step (c) is a newsletter.

8. The method of claim 1, wherein the telephone billing record is an automatic message accounting (AM) record.

9. A method for billing a calling party for a service ordered during a call between a calling party and a called party, within a communications network, comprising:
    (a) receiving, from a called party, a telephone billing record based on a cost of the service ordered; and
    (b) updating a rating record of charges of the calling party based on the telephone billing record, the telephone billing record having a billing amount associated with the cost of the ordered service, a billing rate of the call and a duration of the call being unrelated to at least a portion of the billing amount associated with the ordered service.

10. The method of claim 9, further comprising:
    (c) billing the calling party for the service based on the rating record of step (b).

11. The method of claim 9, further comprising:
    (c) billing the calling party for the service based on the rating record of step (b) and for the cost of the call.

12. The method of claim 9, wherein the rating record is an exchange message interface (EMI) record.

13. The method of claim 9, wherein the called party is a service provider, the calling party is a customer of the service provider.

14. A method for billing a calling party for a service ordered during the call between a calling party and a called party, within a communications network, comprising:

(a) updating a telephone billing record based on a cost of the service ordered, the telephone billing record having a billing amount associated with the cost of the ordered service, a billing rate of the call and a duration of the call being unrelated to at least a portion of the billing amount associated with the ordered service;

(b) forwarding the updated telephone billing record to a telephone billing processor.

15. An apparatus for billing a calling party for a service ordered during a call between the calling party and a called party, within a communications network, comprising:

a switching system connected to the communications network, said switching system receiving, from the called party, a telephone billing record based on a cost of the service ordered, the telephone billing record having a billing amount associated with the cost of the ordered service, a billing rate of the call and a duration of the call being unrelated to at least a portion of the billing amount associated with the ordered service, said switching system updating a rating record of charges of the calling party based on the telephone billing record.

16. The apparatus of claim 15, wherein said switching system bills the calling party for the service based on the rating record.

17. The apparatus of claim 15, wherein said switching system bills the calling party for the service based on the rating record and for the cost of the call.

18. An apparatus for billing a calling party for a service ordered during a call between the calling party and a called party, within a communications network, comprising:

means for receiving, from a called party, a telephone billing record based on a cost of the service ordered, the telephone billing record having a billing amount associated with the cost of the ordered service, a billing rate of the call and a duration of the call being unrelated to at least a portion of the billing amount associated with the ordered service;

means for updating a rating record of charges of the calling party based on the telephone billing record.

* * * * *